INVENTORS
MORTON J. FROME
SIMON T. WRYNN

ATTORNEYS

INVENTORS
MORTON J. FROME
SIMON T. WRYNN

BY
ATTORNEYS 3,525,075
AUTOMATIC DATA REDUCTION SYSTEM
Morton J. Frome, Rockville, Md., and Simon T. Wrynn, Washington, D.C., assignors to the United States of America as represented by the Secretary of the Navy
Filed Mar. 14, 1967, Ser. No. 623,145
Int. Cl. H04q 9/00
U.S. Cl. 340—150          8 Claims

ABSTRACT OF THE DISCLOSURE

The data processing system is provided with a plurality of transducers for obtaining the desired data. Each one of the transducers is connected to a respective data conditioner. The respective data conditioners are sequentially connected to a digital voltmeter by a program sequencer in a predetermined order. The digitized output of the digital voltmeter is fed to a printer which makes a permanent record of the voltmeter's output.

---

The invention described herein may be manufactured and used by or for the Government of the United States of America for governmental purposes without the payment of any royalties thereon or therefor.

The present invention relates to a system for obtaining and recording data and more particularly to a system for obtaining and recording data tests on small boats.

The prior art systems utilized for measuring and recording data on small boat tests generally operated satisfactorily. However, the prior art systems for measuring torque, thrust, r.p.m., trim, rudder angle, rudder Q pressures, speed, heading, change of heading, etc., required a technician to monitor and manually record each channel of data. The recorded data required further manual handling before it could be fed to a computer system for analysis. If a plurality of datum had to be acquired then an equal number of men had to be on the small boat, or, alternatively, a plurality of test runs would have to be made to obtain the desired information.

The present invention eliminates the aforementioned difficulties by providing a data processing system having a plurality of transducers for sensing the physical events to be recorded. The transducer generated signals are fed to a data conditioner which detects and amplifies the transducer generated signals. The detected output of the transducers is fed to a programmer-sequencer which selects the desired detected signals according to a preselected program which has been programmed into the programmer-sequencer. The selected detected signals are fed to a digital voltmeter which produces a digital indication of the detected signal. The digital signal is recorded by a printer which provides a permanent record of the detected transducer signal in digital form.

An object of the present invention is to provide a means for simultaneously recording a plurality of simultaneously performed small boat tests.

Another object of the present invention is to provide a means for simultaneously recording the resulting data from a plurality of small boat tests which can be carried by the boat under test.

Still another object of the present invention is to provide a recorder for small boat tests which records a plurality of signals on a signal channel by utilizing time-sharing-multiplexing techniques.

Other objects and many of the attendant advantages of this invention will be readily appreciated as the same becomes better understood by reference to the following detailed description when considered in connection with the accomapnying drawings wherein.

The invention may be utilized with any plurality of signal generating transducers or signal sources, but can be adequately understood from a description of a system utilizing three signal generating transducers for generating signals simultaneously from the effects of the physical occurrence, or the responses of a small boat, or other device under test.

Figure 1:
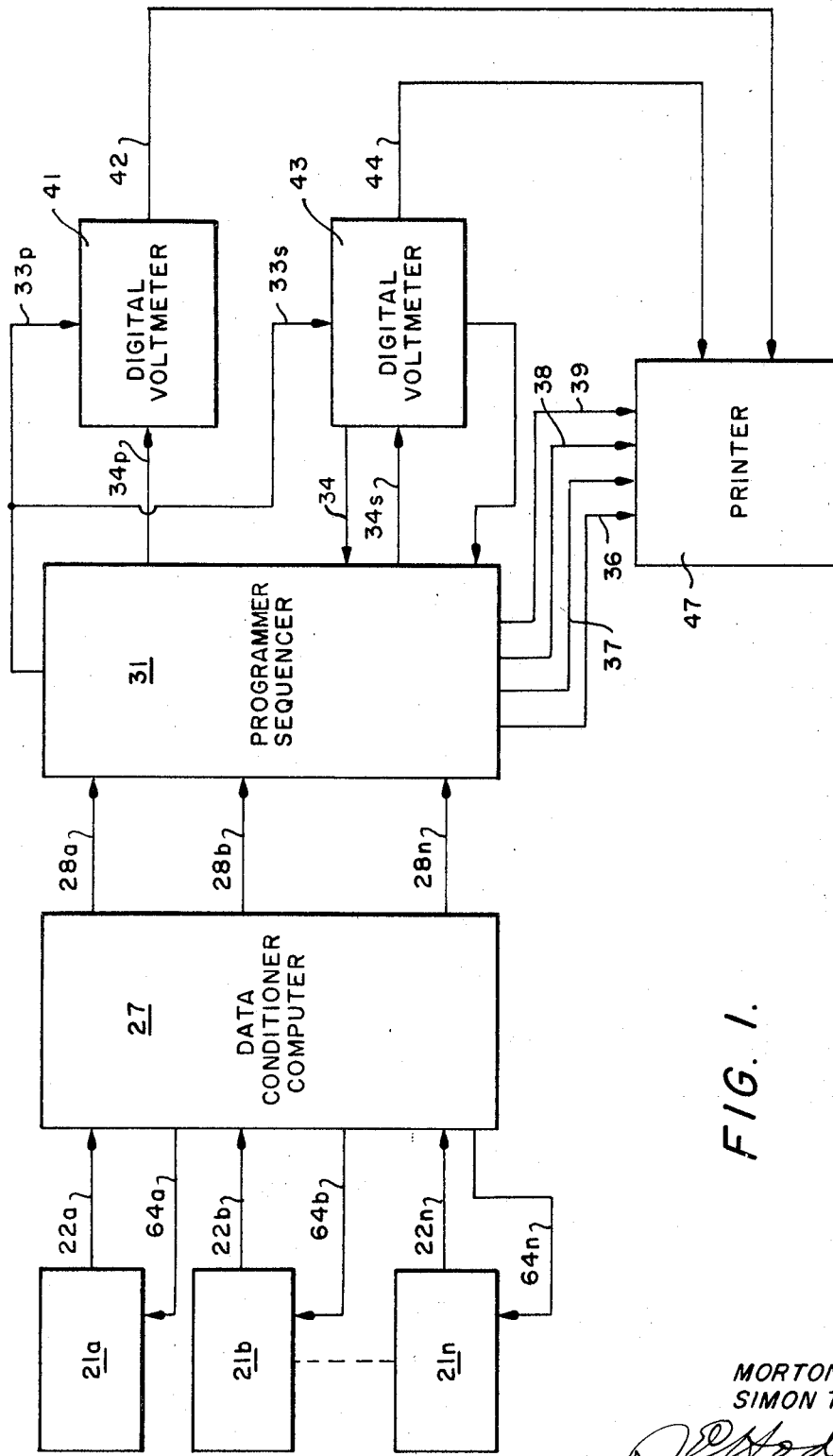
FIG. 1 is a block diagram of a preferred embodiment of the invention.

Referring to FIG. 1 there is illustrated a plurality of transducers 21a, 21b thru 21n. Each one of the transducers are respectively connected by a channel 22a, 22b thru 22n to a respective input of a data conditioner 27. It is to be understood that while the channels forming the connections shown in the block diagram are shown as single lead lines, they are made up of a sufficient number of conductors to complete the signal path from one unit to another. The output of the data conditioner is fed through a plurality of output leads 28a, 28b thru 28n to sequencer 31. The output of the program sequencer is fed to a digital voltmeter 41 by a channel 34p and to a digital voltmeter 43 by channel 34s. Any suitable digital voltmeter may be used in the invention. Suitable digital voltmeters for use in the invention may be purchased from the Hewlett Packard Co. and have a designation No. 3440A. This digital voltmeter is described in the publication entitled Digital Voltmeter published by Hewlett Packard Co., 1501 Pagemill Road, Palo Alto, Calif., USA, copyrighted 1961, printed November 1964. A pair command channel 34 is taken off the digital voltmeter 43 and fed back to the program sequencer 31. The output of the digital voltmeters 41 and 43 are connected through channels 42 and 44 respectively to a printer 47. Any suitable printer may be utilized in the invention. A satisfactory digital printer is described in a publication called Model 562A Digital Recorder, copyrighted 1962 by Hewlett-Packard Co., 1501 Pagemill Road, Palo Alto, Calif. USA, printed August 1962. Channels 36, 37, 38 and 39 are connected from the program sequencer 31 to the printer 47 for conveying a binary code. This binary code is indicative of the specific transducers 21a, 21b thru 21n, which is being recorded at any specific instant.

In order to better understand the operation of the system described in FIG. 1 above, a description of its components as illustrated in FIGS. 2, 3, 4, 5, 6 and 7 referred to above is first presented.

Figure 2:
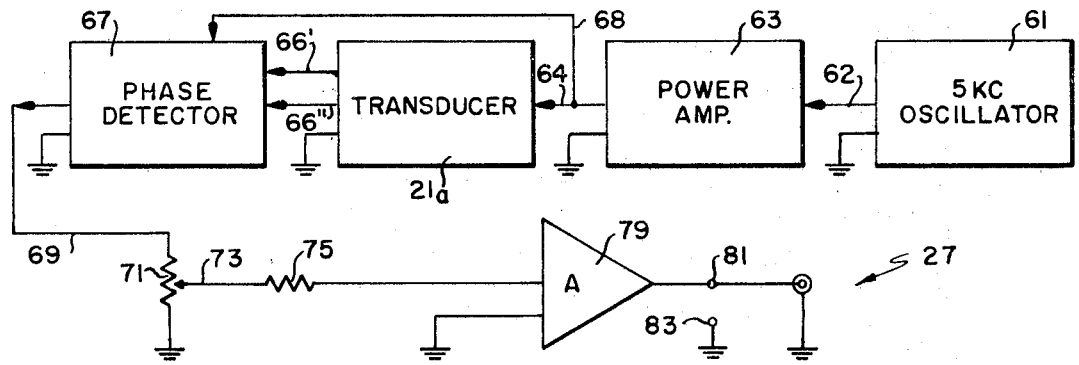
FIG. 2 is a block diagram of a suitable data conditioner and its associated transducers which may be used in the preferred form of the invention.

Referring to FIG. 2 there is presented the block diagram of a data conditioner and its associated transducer, the plurality of data conditioners in the system being illustrated as block 27 in FIG. 1. The data conditioner contains a five kilocycle oscillator for a power supply 61. The output of the five kilocycle oscillator 61 is fed through a channel 62 to a power amplifier 63. The output of the power amplifier 63 is fed by a channel 64 to the input of transducer 21a. Any suitable transducer may be utilized for the transducer 21a. A suitable transducer for use in the invenion is illustrated in the U.S. Letters Patent No. 2,494,579 patented Jan. 17, 1950, entitled Differential Transformer Pick-Up by John Rex Pinlott et al. The transducer 21a is connected by way of channels 66′ and 66″ to the detector 67. Channels 66a and 66b along with their associated ground connection as shown in FIG. 2 are equivalent to what is represented as one of lines 22a, 22b or 22n in FIG. 1. A channel 68 is connected between the output of power amplifier 63 and a third input of the detector 67. The detected output of the detector 67 is fed by way of a channel 69 to a variable resistor 71. The variable resistor 71 has a movable slide arm 73 for obtaining a desired output. The output taken from the contact 73 is fed through a resistor 75 to an amplifier 79. The amplifier 79 may be any suitable amplifier. A suitable amplifier for use as amplifier 79 in the invention is a Philbrick P–65A amplifier described in a catalog having a Library of Congress No. 66–19610 copyrighted in 1966 and published by the Philbrick Research Corp., having an address of Light Drive, Route 128, Dedham, Mass. 02026. The output of the amplifier is taken across terminals 81 and 83.

The operation of FIG. 2 is as follows: The five kilocycle oscillator provides an output signal of five kilocycles which is fed to a power amplifier 63. The power amplifier 63 amplifies the five kc. oscillator signal and provides the constant output signal to the input of transducer 21a. The output of the power amplifier is also fed as a reference signal to the reference input of detector 67. The detector 67 compares the output of the transducer 21a with the output of the power amplifier 63 and provides an output signal which is indicative of the amplitude of the 5 kc. signal from the transduuer and its phase relationship to the power amplifier 63. If the output of the power amplifier and the transducer are in phase, the output of the detector would be positive. If the output of the power amplifier and the transducer are out of phase the output will be negative. The amplitude of the detector output will be proportional to the amplitude of the transducer output. The output of the detector 67 is fed to a variable resistor 71 having adjustable wiper arm output so that the desired signal level may be chosen. The wiper arm output is then amplified by a constant amount by amplifier 79 and thereafter presented to the terminals 81 and 83.

Figure 3:
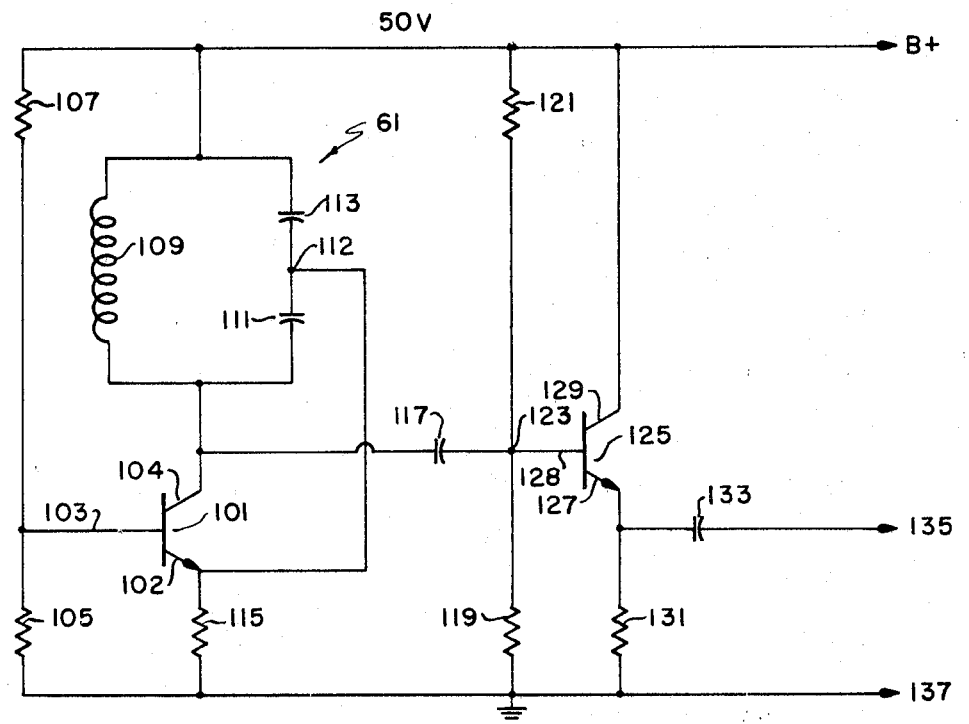
FIG. 3 is a circuit diagram of a suitable oscillator which may be used in the data conditioner illustrated in the block diagram of FIG. 2 as a power supply.

Referring to FIG. 3 there is provided an oscillator shown as element 61 in FIG. 2. The oscillator 61 comprises a first transistor 101 of NPN type. It is to be understood however that wherever there are NPN transistors, PNP transistors may be utilized with the common known provision of changing the power supply polarity. The transistor 101 contains an emitter electrode 102, a base electrode 103, and a collector electrode 104. A resistor divider including resistors 105 and 107 is connected between a source of B+50 volts and ground. The base electrode 103 of the transistor 101 is connected to the junction of the resistors 105 and 107. The collector electrode 104 of the transistor 101 is connected to one end of an inductor 109. The other end of the inductor 109 is connected to the source of the B+ potential. Capacitors 111 and 113 are connected in series and have a common junction point 112. The free end of the series connected capacitor 111 is connected to the collector electrode 104 of the transistor 101 and the free end of the series capacitor 113 is connected to the B+ potential 50 volts. The capacitors 111 and 113 are therefore connected in parallel with the inductor 109. The junction point 112 of the series capacitors 111 and 113 is connected to the emitter electrode 102 of the transistor 101. The emitter electrode 102 of the transistor 101 is also connected to ground by way of a resistor 115. The transistor 101 and its associated circuitry forms a Colpitts oscillator and the components are chosen so that the output thereof is five kilocycles. The output of the oscillator is taken from the collector electrode 104 of the transistor 101 by way of a capacitor 117 which has one end connected to the collector electrode 104 and the other end connected to the junction point 123. A resistor divider made up of resistors 119 and 121 is connected between ground and the source of B+ voltage with the junction 123 being the mid point of the series connected resistors 119 and 121. A transistor 125 having an emitter electrode 127, a base electrode 128, and collector electrode 129 is of the NPN type. The base electrode 128 of the transistor 125 is connected to the junction point 123. The collector electrode 129 of the transistor 125 is directly connected to the source of B+ potential and a resistor 131 is connected between the emitter electrode 127 and ground. The transistor 125 performs the function of an emitter follower transistor and an output is taken by way of a capacitor 133 which is connected to the output lead 135. The output is taken across terminals 135 and 137.

Figure 4:
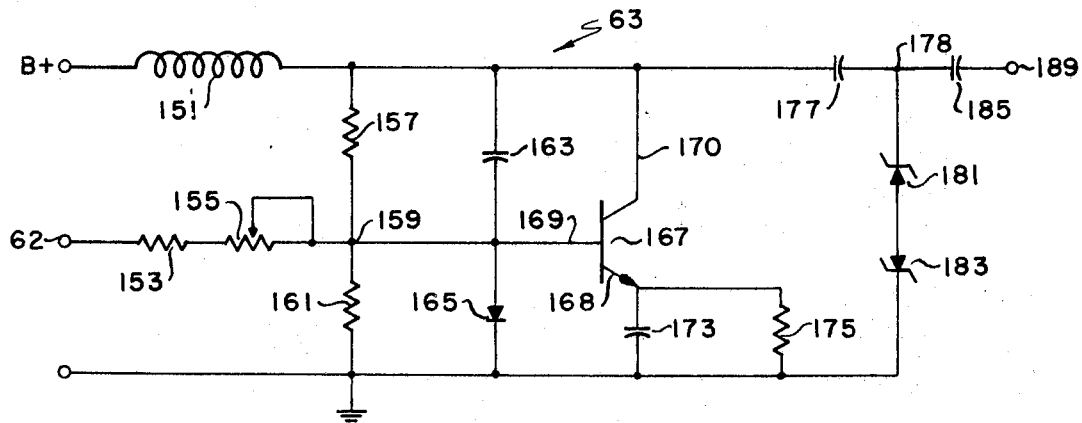
FIG. 4 is a circuit diagram of a suitable temperature stabilized amplifier which may be used in the data conditioner illustrated in the block diagram of FIG. 2.

The power amplifier shown as box 63 in FIG. 2 is illustrated in detail in FIG. 4. The power amplifier has a B+ potential placed on one end of a choke 151. The input signal to the power amplifier is supplied by channel 62 through a resistor 153 connected in series with a variable resistor 155, to the junction point 159. A resistor 157 has one of its ends connected to the other end of the choke 151 and its other end connected to the junction point 159. A second resistor 161 is connected between junction point 159 and ground. A capacitor 163 is connected in parallel across resistor 157. A temperature stabilization diode 165 is connected in parallel with the resistor 161. An NPN transistor 167 having an emitter electrode 168, a base electrode 169, and a collector electrode 170 has its collector electrode connected to the junction of choke 151, the resistor 157 and the capacitor 163. The base electrode 169 of the transistor 167 is connected to the junction point 159. The emitter electrode 168 of the transistor 167 is connected to ground through the parallel combination of capacitor 173 and resistor 175. An output capacitor 177 is connected between the collector electrode 170 of the transistor 167 and the junction point 178. A first and second Zener diode 181 and 183 is connected between the junction point 178 and ground. The Zener diodes 181 and 183 are connected in a back to back relationship with the cathode of the Zener diode 181 connected to the terminal 178 and the cathode of the Zener diode 183 connected to the ground connection. An output signal is taken from the circuit of the power amplifier circuit through the capacitor 185 which has one of its ends connected to junction point 178 and its other end connected to output terminal 189.

The operation of the power amplifier circuit 63 is as follows: the 5 kc. signal generated by the oscillator 61 is applied to the input terminal 62 of the amplifier. The signal is then amplified by the transistor 167 and is fed to the output terminal 189. The diode 165 is provided for temperature stabilization of transistor 167 operating point so as to hold collector current constant with temperature changes. The Zener diodes 181 and 183 across the output prevents the power amplifier from having an output which is more than a predetermined amount. This amount is due to the back to back breakdown potentials of the Zener diodes and in a suitable laboratory embodiment is approximately 10 volts.

Figure 5:
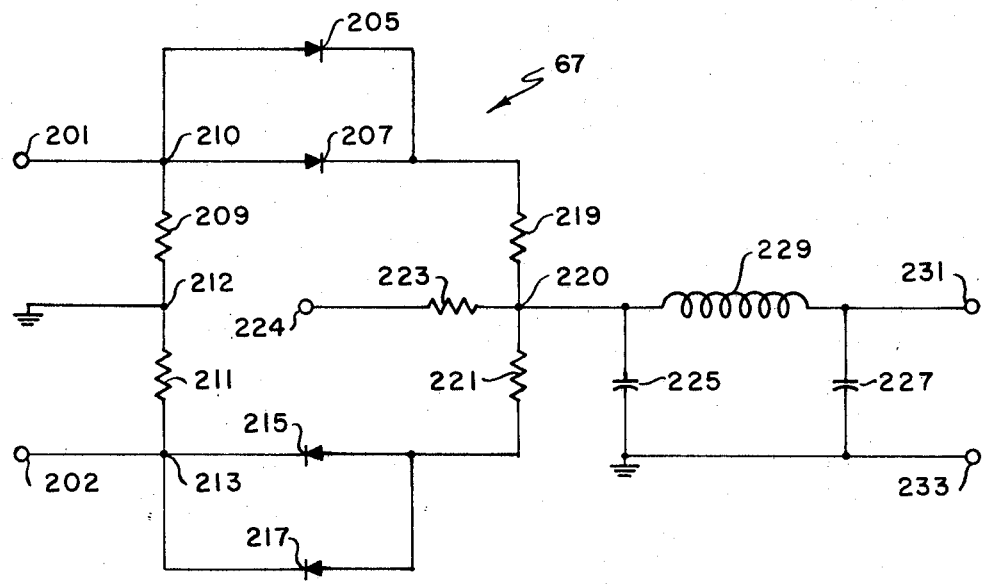
FIG. 5 is a circuit diagram of a suitable phase sensitive detector which may be used in the data conditioner illustrated in the block diagram of FIG. 2.

The phase detector 67 of FIG. 2 is illustrated in detail in FIG. 5. The input terminal 201 is connected to the channel 66′ of the transducer 21a and the input terminal 202 is connected to the channel 66″ of the transducer 21a. A resistor 209 has one end connected to the input terminal 201 and its other end connected to the junction joint 212 which is a grounded junction point. The resistor 211 is connected between junction points 212 and 213. First and second diodes 205 and 207 are connected in parallel with the anodes connected to the junction point 210 and the cathodes connected to one end of the resistor 219. The other end of resistor 219 is connected to a common junction point 220. A second pair of diodes 215 and 217 have their cathodes connected to the junction point 213 and their anodes connected to one end of a resistor 221. A terminal 224 is provided for connection to the output channel 68 of the power amplifier 63. A resistor 223 is connected between the terminal 224 and the junction point 220. A first condenser 225 is connected between the ground and the junction 220. An inductor 229 is connected between the junction 220 and the output terminal 231. The capacitor 227 is connected between the terminal 231 and the terminal 233. The combination of the capacitors 225 and 227 and the inductor 229 form a low pass filter circuit for filtering out the residual 5 kc. from the D.C. signal present across the terminals 231 and 233.

The operation of the detector circuit of FIG. 5 is as follows: the output signal of the transducer 21a is fed to the respective terminals 201 and 202. This output signal is compared with the output of the power amplifier 63 which is fed to the terminal 224. If the output signal from the transducer 21 is in phase in respect to the power amplifier signal then a positive signal is provided at the terminal 220 which is then supplied to the output terminal 231. If the transducer signals are 180° out of phase in respect to the power amplifier output then a negative signal would be presented at the junction point 220. The signal which is presented at terminal 220 passes through the filter to the output terminal 231.

Figure 6:
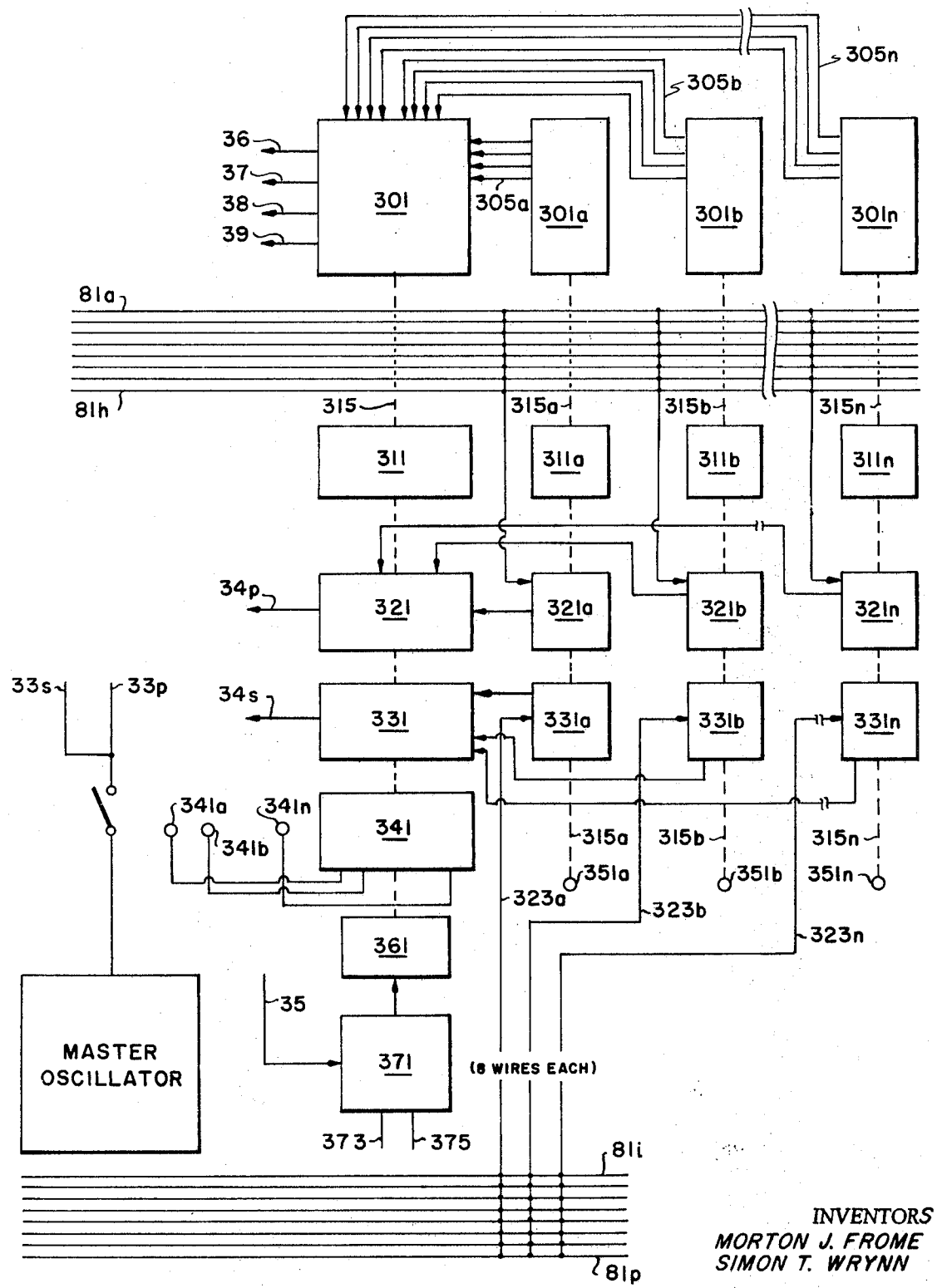
FIG. 6 is a block diagram of a suitable program sequencer which may be used in the preferred embodiment of the invention.
Figure 7:
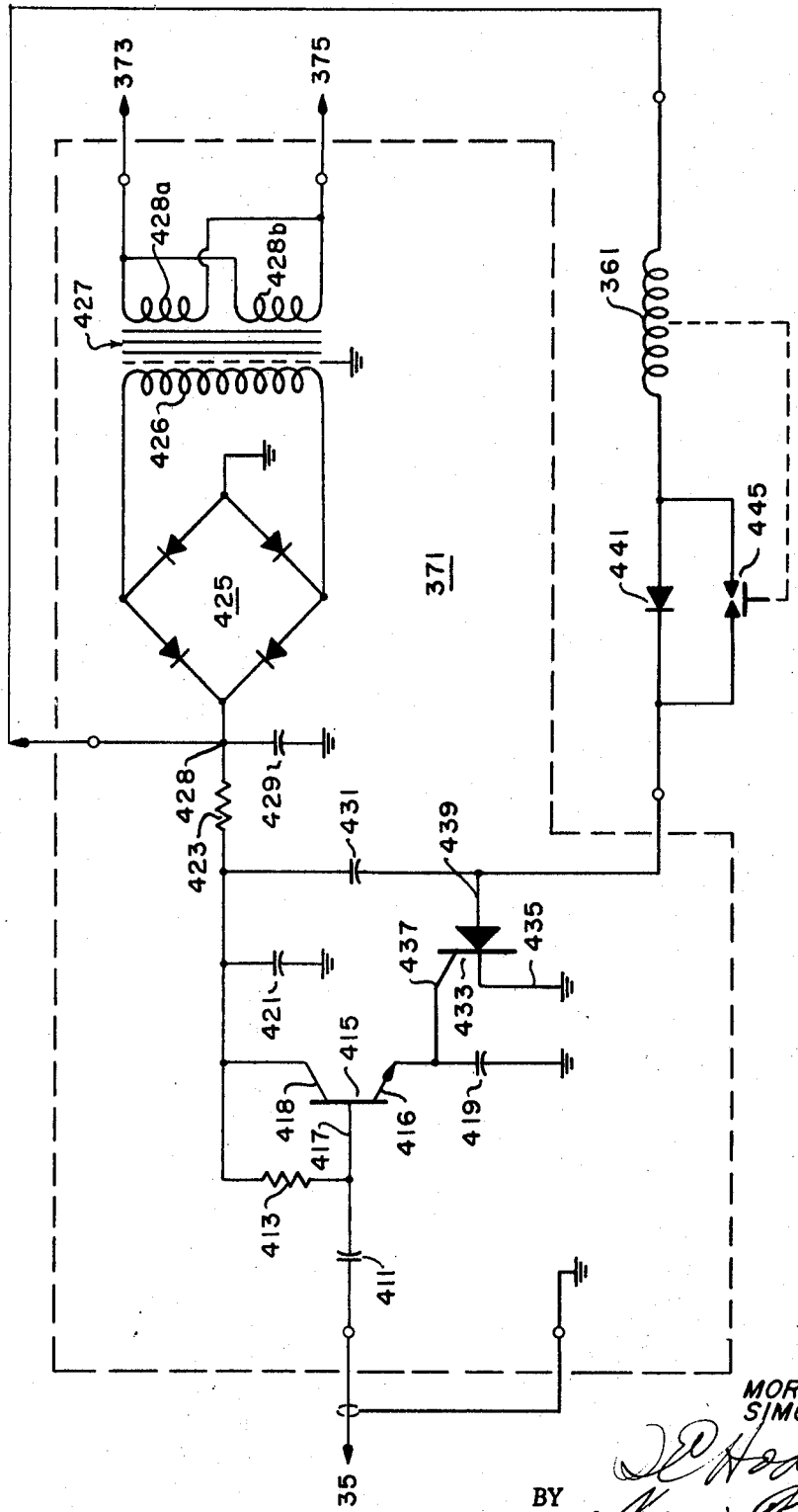
FIG. 7 is a circuit diagram of a suitable print command driver circuit which may be used in the program sequencer illustrated in the block diagram of FIG. 6.

Referring to FIG. 6 there is illustrated the programmer sequencer 31 of FIG. 1. The program sequencer illustrated in FIG. 6 will be explained as having sixteen inputs, being eight port inputs and eight starboard inputs. These port and starboard inputs, by way of example and not limitation, relate to the preferred embodiment where a symmetrical, twin-screw boat was provided with eight items to be monitored such as port engine speed and starboard engine speed, port engine thrust and starboard engine thrust, etc. In other words there are eight symmetrical pairs of various types of transducers sensing the items monitored and these transducers are labelled 21a through 21n in FIG. 1. As previously stated, a plurality of data conditioners as shown in FIG. 2 are provided, one for each transducer. Each data conditioner in the data conditioner computer 27, in preparing the sixteen signals for the program sequencer, brings the signal level of each transducer up to a uniform signal level and provides impedance isolation. These data conditioner outputs are labelled 81a to 81p. In order to accommodate sixteen different signal channel inputs sequenced two at a time, eight-eight positioned switches are required. It is to be understood, however, that the system will be operable with any number of signal channels and any number of switch positions. For the purposes of illustration a description will be given which incompasses the embodiment built in the laboratory. A four channel or wafer, eight position switch 301 is provided having output channels 36, 37, 38 and 39. Four channels 305a are connected between respective four terminals of the switch 301 and an eight position switch 301A. The eight positioned switch 301A is an eight position binary programmer which presents a binary output on channels 305a indicating the position of the switch 301A. Similarly a second set of four channels 305B is connected to another set of terminals of the switch 301 from the binary programmer switch 301B. Similarly the system employs N sets of four channels 305N. The box 311 contains a "Nixie" light made by the Burroughs Co. which indicates the position to which the switch 301 is connected. The switches 301, 321, 331, 311 and 341 are all ganged together by way of a shaft 315 shown as a dotted line. Similarly the binary program switch 301A is coupled to a shaft 315A which couples the "Nixie" light, and switches 301A, 321A and 331A. The boxes 321A and 331A are each an eight position switch. The position to which the switch is set is controlled by the knob 351A mounted on the common shaft 315A. The "Nixie" light in box 311A shows to which position the shaft and switches have been rotated. Similarly, the "Nixie" light box 311B shows the position to which the switches 321B, 331B and binary indexing switch 301B has been set by the knob 351B connected to common shaft 315B. The output switches 321A, 321B and 321N are connected to a respective input of the switch 321 to be presented to the output 34P of the switch 321. Similarly, the output of the switches 331A, 331B and 331N are presented to the respective inputs of the switch 331. The output of the switch 331 is presented on output channel 34S. The switch 341 has N outputs 341A, 341B, 341N which indicates electrically to which switch position the switch has been switched. A solenoid 361 turns the shaft 315 around one switch position at a time and the details of the solenoid coil circuit are shown in FIG. 7. Suitable switches for the use in this invention may be made by any manufacturer, however, switches found suitable for use in this invention have been manufactured by the Ledex Co., Inc. of 123 Webster Street, Dayton, Ohio. The switches are described in a catalog copyrighted in 1963 by Ledex, Inc. of Dayton, Ohio. A suitable switch is shown on page 34 of the aforementioned catalog as a 24 positioned throw switch series 250. The part number of the switch is 250–559–246 for a switch using 115 volts rectified AC current. It is to be noted however that the aforementioned switch has nine poles and 24 four positions. For use as an eight position switch, the first, 9th and 17th terminals will be tied together. Similarly the 2nd, 10th and 18th terminals would be tied together etc. The switch 301 would use four poles, the switch 311 feeding the "Nixie" light therein would use 1 pole, the switch 321 would use one pole, the switch 331 would use one pole and the switch 341 would use one pole of the Ledex switch, thereby leaving one spare pole for another circuit if desired. The box 371 is a stepping circuit for causing the solenoid 361 to step from position to position. The solenoid stepping position is supplied with an AC voltage at through lines 373 and 375. The stepping signal comes from one of the digital printers by way of channel 35 called the print command channel. A master oscillator 381 is utilized for supplying pulses of 1 cycle per second as an example, is utilized as a timing signal which is fed by way of channels 33p and 33s to the digital voltmeters 41 and 43.

The operation of the block diagram illustrated in FIG. 6 is as follows: the particular knobs for switching channels A, B thru N having switches 301A, 311A, 321A, 331A, 301B, 311B, 321B, 331B, 301N, 311N, 321N and 211N are set in their respective position 1 through 8 as desired. It is noted that the system illustrated has sixteen inputs and each one of the inputs A through H are connected to a respective pole of the switches 321A, 321B, and 321N and each of the inputs 81I through 81P are each connected to positions one through eight of the switches 331A, 331B and 331N. The switches 321A through 321N and 311A through 311N and 301A through 301N and 331A through 331N are set to the desired position by respectively setting the knob 351A to the desired position, by setting the knob 351B to the desired position and by setting the rest of the knobs through 351N to the desired position. Setting the position of the knobs 351A through 351N determines the respective channels A, B through N which are fed to the digital voltmeters 41 and 43. Each of the eight position binary programmer switches 301A, 301B through 301N has an output voltage signal on its output channels as shown in the following table. The word No. stands for no signal.

| Knob position | Channel being fed to Digital Voltmeter 41 | Channel being fed to Digital Voltmeter 43 | Channel 1 | 2 | 3 | 4 |
|---|---|---|---|---|---|---|
| 1 | 81a | 81i | Sig | No. | No. | No. |
| 2 | 81b | 81j | NOs | Sig | No. | No. |
| 3 | 81c | 81k | Sig | Sig | No. | No. |
| 4 | 81d | 81l | Sig | Sig | Sig | No. |
| 5 | 81e | 81m | Sig | Sig | Sig | No. |
| 6 | 81f | 81n | No. | Sig. | No. | Sig |
| 7 | 81g | 81o | Sig | Sig. | No. | Sig |
| 8 | 81h | 81p | No. | Sig | Sig | Sig |

The print command signal causes the print command circuit 371 to generate a stepping pulse for activating the solenoid 361. Activating the solenoid by a single pulse causes the Ledex switch to rotate one position thereby rotating the switches 341, 331, 321, 311 and 301 by a single step. Assuming that the switch 311 is in the first position then the output of switch 311 is connected to the switch 311A. When the switch 311 rotates to the second position then the output of switch 311 would be connected to the switch 311B, similarly, another stepping pulse would cause the solenoid to rotate the switch 311 to connect the switch 311c to the output of switch 311. Therefore, it can be readily seen that the channels A through N may be selected by setting knobs 351a through 351n at a respective position, in this example, at any of the positions 1 through 8. Thereafter the sequence of the lines to be fed out to the output channels 34P and 34S can be chosen and labeled. Setting the knobs 351A through 351N determines the program sequence to be measured by the digital voltmeters and recorded by the printer 47.

Figure 8:
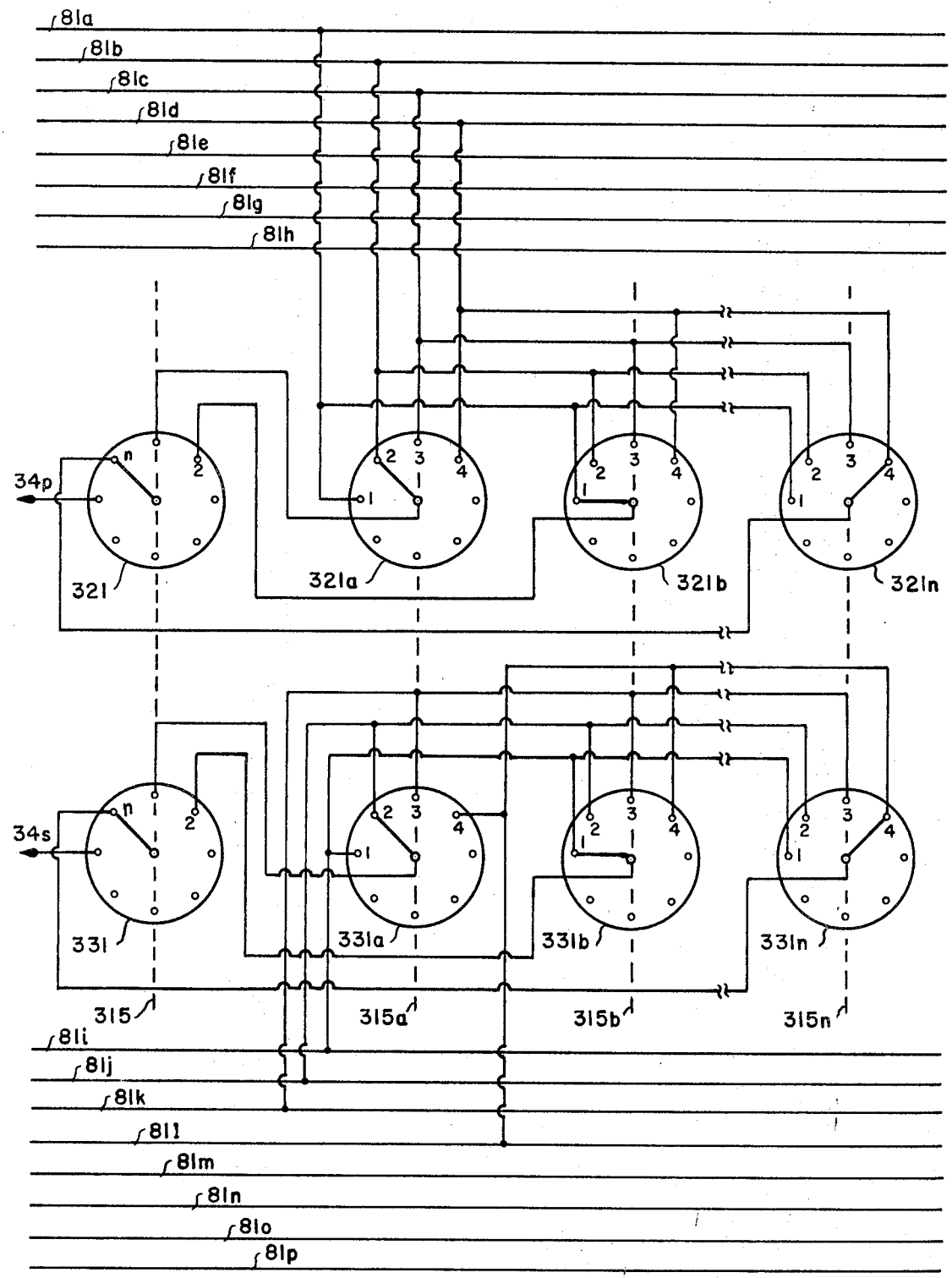
FIG. 8 is a circuit diagram of a portion of the program sequencer depicted in FIG. 6.

FIG. 8, a circuit diagram of a portion of the program sequencer 31 portrayed in FIG. 6, is furnished in order to more clearly show the operation of the sequencer. As in FIG. 6, the transducer outputs are fed through the data conditioner computer 27 and appear as conductors 81a to 81p. Conductors 81a and 81i carry the signals of a pair of port-starboard transducer signals, 81b and 81j carry the signals of another pair of port-starboard transducer signals, and so forth. Representative switch wafers from FIG. 6, 321, 321a, 321b, 321n, 331, 331a, 331b and 331n are shown in detail. Switch wafers 321 and 331 are located on the step switch while the other wafers are located on hand operated shafts 315a, 315b and 315n.

For the purpose of illustration, only four pairs of conductors are shown connected to the wafers: 81a and 81i, 81b and 81j, 81c and 81k, and 81d and 81l. Conductor 81a is connected to the first position of the hand switched wafers 321a, 321b and 321n, while the other conductor of the pair, 81i, is connected to the first position of wafers 331a, 331b and 331n. Conductor 81b is connected to the second positions of each of the hand switched wafers 321a, 321b and 321n while conductor 81j is connected to the second positions of the hand switched wafers 331a, 331b and 331n. The other conductor pairs are connected in a similar fashion. The arms of each of the wafer pairs of the hand operated shafts are connected to sequential contacts of the step switch. As shown, the arm of 321a is connected to the first position contact of wafer 321, the arm of 331a is connected to the first position contact of wafer 331, the arm of 321b is connected to the second position contact of wafer 321, and so forth. The result of this type of connection pattern is that each wafer set on a common shaft has all the transducer information fed to it. It is then up to the operator to select which pair of conductors are fed to any of the sequential contacts of the wafer pair 321, 331 of the step switch since the arms of the wafer pairs of the hand operated switches are connected sequentially to the first, second and "nth" positions of the wafer pair of the step switch. As the step switch steps around, its arms, connected to the port and starboard digital voltmeters, will allow sampling of whichever transducer pair was pre-selected by the operator for that position of the stepping sequence.

As shown in FIG. 6, wafer decks 301a and 301b, also tied to shafts 315a and 315b, are connected in such a fashion so as to indicate, via a binary coded signal, the particular switch position selected by the operator for the step switch. The binary signal is directly recorded by the printer as sent over lines 36 to 39.

Referring to FIG. 7 a channel 35 carries the print command signal from the digital voltmeter 43. The channel 35 is connected to one end of capacitor 411 and the other end of the capacitor 411 is connected to the base electrode 417 of a transistor 415. The transistor 415 also has an emitter electrode 416 and a collector electrode 418 and is of the NPN variety. A capacitor 419 is connected between the emitter electrode 416 of the transistor 415 and ground. A resistor 413 is connected between the base electrode 417 and the collector electrode 418 of the transistor 415. A capacitor 421 is connected between the collector electrode 418 of the transistor 415 and ground. A charge control resistor 423 has one of its ends connected to the collector electrode 418 of the transistor 415 and its other end connected to the junction 428. A capacitor 429 is connected between the junction point 428 and ground. A full bridge diode rectifier 425 is connected across a secondary winding 426 of the transformer 427 for rectifying the AC potential which is supplied to the input terminal 373 and 375 of the transformer primary windings 428A and 428B.

A capacitor 431 is connected between the collector 418 of transistor 415 and the anode 439 of the silicon control rectifier 433. The silicon control rectifier has a cathode 435 and a control electrode 437, which is connected to the emitter electrode 416 of the transistor 415. The cathode electrode 435 of the silicon control rectifier 433 is connected to ground and the anode 439 of the silicon control rectifier 433 is connected to the cathode of the diode 441. The anode of the diode 441 is connected to one end of solenoid control winding 361 and the other end of the solenoid control winding 361 is connected to the junction point 428. A cam mechanism is provided for opening and closing a switch 445 momentarily after each time the solenoid is activated.

The circuit of FIG. 7 operates as follows: a print command pulse coming through the channel 35 is applied to the base electrode 417 of the transistor 415 thereby making the transistor conductive. The pulse caused by the transistor 415 becoming conductive fires the silicon control rectifier 433. Firing the silicon control rectifier grounds the junction of the condensor 431 and the diode 441 causing a current pulse to flow through the solenoid 361 thereby stepping the switches one position. Just after the switch has been stepped one position the contact 445 is opened by a cam action which allows the silicon control rectifier to return to the high resistance state, and then automatically closes as soon as the solenoid has stopped acting.

The operation of FIG. 1 is as follows: the transducers 21A through 21N each continuously monitor their respective physical occurrence. The signals developed in the transducers are then prepared by data conditioner 27 which feeds the signal on to the program sequencer 31. The proper one of the transducer signals is then fed to the digital voltmeters 41 and 43 as preselected by the respective switches 311A through 311N, 321N through 321N, 331A through 331N. The timing pulses from the master oscillator keep both digital voltmeters in synchronism. The preselected conditioned voltage signal from the preselected transducer and its corresponding binary code are fed for recordation on a printer 47 which makes the permanent record of the signal being monitored by the respective transducer and the transducer which have been selected.

Obviously many modifications and variations of the present invention are possible in the light of the above teachings.

What is claimed is:

1. An automatic data reduction system comprising:
    a plurality of data conditioning means each having a respective input and a respective output;
    a plurality of signal sources having an output signal, each source being connected to a respective data conditioning means input;
    means for selecting said data conditioned signals, including sequence selection means, and for indicating which data conditioned signal has been selected having a plurality of inputs and an output, said selecting means inputs being connected to respective ones of said data conditioner output; and
    means for making a permanent record of said selected signal having an input, said recording means input connected to said selecting means output whereby the signals to be selected and their order of selection may be chosen and recorded.

2. An automatic data reduction system as described in claim 1 but further characterized by having a digital voltmeter connected between said selecting means output and said recording means input.

3. An automatic data reduction system as described in claim 2 but further characterized by each of said data conditioning means comprising:
    an oscillator having an output;
    an amplifier having an output and an input, said amplifier input being connected to said oscillator output;
    a phase detecting means having a signal source input, a reference input and an output, said respective signal source being connected to said detector signal source input, said detector reference input being connected to said amplifier output; and
    a second amplifier having an input and an output, said input of said second amplifier being connected to said detector output, and said output of said second amplifier being said data conditioning means output.

4. An automatic data reduction system as described in claim 3 but further characterized by said means for selecting data conditioned signals comprising:
    a plurality of switches, each switch having a plurality of poles and a single output, each of said plurality of poles of each switch being connected to a respective data conditioning means;
    means connected to each switch for providing a binary indication of the switch position, whereby each switch position corresponding to a preselected data condition signal;
    a solenoid operated switch having a plurality of wafers, each wafer having a plurality of input poles and an output whereby each wafer functions as a separate switch, said input poles of a first wafer being connected to a respective output of said plurality of switches, and at least four of said wafers having their input poles connected to said binary indication means, said outputs of said wafers being connected to said recording means.

5. An automatic data reduction system as described in claim 4 but further characterized by having:
    a digital voltmeter having an input and an output, said digital voltmeter input being connected to one of said switch wafer outputs and said digital voltmeter output being connected to said recording means;
    said digital voltmeter having an output for providing stepping pulses;
    a pulse generating circuit comprising a first transistor having an emitter electrode, a base electrode and a collector electrode, a silicon control rectifier having an anode, a cathode and a control electrode, said silicon control rectifier control electrode being connected to said emitter electrode;
    a reference potential;
    a capacitor connected between said silicon control rectifier anode and said collector electrode of said transistor, said cathode of said silicon control rectifier being connected to a reference potential;
    said solenoid having a solenoid winding, said silicon control anode being connected to said solenoid winding whereby each of said stepping pulses causes said solenoid to rotate to said next successive pole.

6. An automatic data reduction system as described in claim 2 but further characterized by said means for selecting data conditioned signals comprising:
    a plurality of switches, each switch having a plurality of poles and a single output, each of said plurality of poles of each switch being connected to a respective data conditioning means;
    means connected to each switch for providing a binary indication of the switch position, whereby each switch position corresponding to a preselected data condition signal;
    a solenoid operated switch having a plurality of wafers, each wafer having a plurality of input poles and an output whereby each wafer functions as a separate switch, said input poles of a first wafer being connected to a respective output of said plurality of switches, and at least four of said wafers having their input poles connected to said binary indication means, said outputs of said wafers being connected to said recording means.

7. An automatic data reduction system as described in claim 1 but further characterized by said means for selecting data conditioned signals comprising:
    a plurality of switches, each switch having a plurality of poles and a single output, each of said plurality of poles of each switch being connected to a respective data conditioning means;
    means connected to each switch for providing a binary indication of the switch position, whereby each switch position corresponding to a preselected data condition signal;
    a solenoid operated switch having a plurality of wafers, each wafer having a plurality of input poles and an output whereby each wafer functions as a separate switch, said input poles of a first wafer being connected to a respective output of said plurality of switches, and at least four of said wafers having their input poles connected to said binary indication means, said outputs of said wafers being connected to said recording means.

8. An automatic data reduction system as described in claim 1 but further characterized by each of said data conditioning means comprising:
    an oscillator having an output;
    an amplifier having an output and an input, said amplifier input being connected to said oscillator output;
    a phase detecting means having a signal source input, a reference input and an output, said respective signal source being connected to said detector signal source input, said detector reference input being connected to said amplifier output; and
    a second amplifier having an input and an output, said input of said second amplifier being connected to said detector output, and said output of said second amplifier being said data conditioning means output.

References Cited

UNITED STATES PATENTS

| | | | |
|---|---|---|---|
| 3,044,563 | 7/1962 | Gumpertz et al. | 340—150 |
| 3,180,148 | 4/1965 | Huckabay et al. | 340—150 |

THOMAS A. ROBINSON, Primary Examiner

U.S. Cl. X.R.

340—182